United States Patent [19]
Kay et al.

[11] 3,854,920
[45] Dec. 17, 1974

[54] HIGH TEMPERATURE BENDING

[75] Inventors: Soloman Elijah Kay, Solihull; John Pickard, Studley, both of England

[73] Assignee: Triplex Safety Glass Company, Limited, London, England

[22] Filed: Oct. 11, 1973

[21] Appl. No.: 405,543

Related U.S. Application Data

[63] Continuation-in-part of Ser. Nos. 92,255, Nov. 23, 1970, abandoned, and Ser. No. 755,270, Aug. 26, 1968, abandoned, said Ser. No. 92,255, is a continuation of Ser. No. 755,270.

[30] Foreign Application Priority Data

Sept. 5, 1967  Great Britain................... 40600/67

[52] U.S. Cl.................... 65/106, 65/273, 65/287, 65/374
[51] Int. Cl............................................. C03b 23/02
[58] Field of Search... 65/106, 273, 275, 287, 374, 65/275

[56] References Cited
UNITED STATES PATENTS

| 2,442,242 | 5/1948 | Lewis............................... 65/106 X |
| 2,777,254 | 1/1957 | Siefert............................. 65/374 X |
| 3,421,875 | 1/1969 | Kirkman............................. 65/273 |
| 3,481,390 | 12/1969 | Veltri et al........................... 65/3 X |

*Primary Examiner*—Arthur D. Kellogg
*Attorney, Agent, or Firm*—Snyder, Brown and Ramik

[57] ABSTRACT

Bent glass sheets are produced with avoidance of "spring back" on cooling, by applying complementary bending surfaces to a heated flat glass sheet, which surfaces are at substantially the bending temperature of the glass, and maintaining the surfaces closed on the sheet for a time sufficient to permit decay of thermal inhomogeneities and bending stresses.

18 Claims, 3 Drawing Figures

SOLOMAN E. KAY &
JOHN PICKARD,
Inventors

SOLOMAN E. KAY &
JOHN PICKARD,
Inventors

HIGH TEMPERATURE BENDING

CROSS REFERENCES TO RELATED APPLICATIONS

This application is a continuation-in-part of our co-pending application Ser. No. 92,225 filed Nov. 23, 1970 now abandoned, and of our prior copending application Ser. No. 755,270 filed Aug. 26, 1968 now abandoned of which said Ser. No. 92,255 is a continuation.

BACKGROUND OF THE INVENTION

This invention relates to the manufacture of bent glass sheets.

One method of manufacturing bent glass sheets generally adopted in industry consists in suspending a flat glass sheet and passing it in suspended condition through a furnace where it is heated to a temperature at or above the temperature at which the glass sheet can be conformed to a desired configuration.

The flat heated glass sheet is then withdrawn from the furnace and moved to a bending station where the suspended heated sheet is located between a pair of horizontally acting complementary bending dies, which dies are immediately advanced and applied to the suspended sheet, thereby conforming the sheet with their configuration. In those areas where a higher degree of curvature is required, e.g., in the terminal area of those windscreens which are more sharply curved at the side portions than in the main body of the light, it may be necessary to increase locally the temperature of the glass before removal from the furnace.

When the glass sheet enters between the complementary bending dies, the temperature of the glass is of the order of 680°C, while that of the bending dies is somewhat above that of the ambient atmosphere and may be of the order of 100°C because of successive transmission of heat from the glass to the bending dies during a series of bending operation, so that when the complementary bending dies first contact the glass surfaces, there will be a temperature differential of some 600°C between the contact surfaces of the complementary bending dies and the contact surfaces of the glass sheet. At these locations heat will be extracted from the glass sheet by the complementary bending dies, and the amount of heat extracted will vary with the die surface material, and with the pressure and duration of contact of each area of the bending dies with the glass surfaces.

When the bending operation is completed and the dies are withdrawn from contact with the glass, temperature differences will exist through the thickness and over the surface of the glass sheet. At these temperature differences throughout the curved glass decay, distortion of the glass sheet will occur due to the relief of the residual thermal stresses in the glass sheet. In consequence the final shape of the glass sheet and the shape initially imparted to it by the bending dies are no longer the same. This is sometimes referred to as "springback."

In order to bend flat sheets to a specified shape, it has been proposed to form the bending dies to a different shape in order to allow for the relaxing of the initially imposed shape. Since it is not possible to control accurately the amount of heat extracted from a series of glass sheets by such conventional bending dies, neither the required shape of the bending die nor the final shape of the curved glass sheet is readily predictable.

The main object of the present invention is to minimise "springback," and to improve substantially the consistent accuracy of curvature in the bent glass sheet.

SUMMARY

The present invention involves a novel principle of operation in which at the end of a bending operation the bent glass sheet derived by conforming a flat glass sheet to the curvature of complementary bending surfaces is at substantially the same temperature throughout the thickness dimension of the glass sheet and across the surface of the glass sheet as that of the bending surfaces.

In carrying the novel principle of operation into effect, the complementary bending surfaces applied to the heated flat glass sheet to conform the sheet to the curvature of said surfaces are at substantially the bending temperature of the glass so that the occurrence of a heat exchange during bending is minimised.

The bending temperature range of industrial soda-lime-silicate glass sheets lies between 550° and 680°C, an optimum temperature being about 580°C.

One or both of the bending surfaces may engage only marginal areas of the flat glass sheet. Preferably each bending surface has an area projected on to the plane of the flat glass sheet which is at least equal to the surface area of said flat glass sheet. In the latter case, even if there is some departure from uniform heating in the furnace, a uniformly heated sheet will be subjected to the bending operation because the environment between the hot bending surfaces, i.e., the local environment in which the heated glass is located as a step precedent to bending, is a heated environment at a temperature substantially equal to the bending temperature of the glass.

Accordingly, in putting the present invention into practice the bending surfaces may be maintained at an optimum temperature which is the same as the average temperature of the flat glass sheet, whereby there is substantially no loss of heat from the heated glass sheet at the bending station. This ensures thermal homogeneity in the flat glass sheet by smoothing out any small variations, e.g., 5°C to 10°C, from the temperature intended to be derived from the furnace as a step precedent to bending and at the end of the bending operation the bent glass sheet and the complementary bending surfaces will be at substantially the same temperature.

In carrying out the present invention the amount of heat contained in the glass sheet is significantly lower than the amount of heat required in a glass sheet leaving a furnace where allowance has to be made for considerable heat loss.

By effecting a bending operation in accordance with the invention, marring of the surface of the heated glass sheet by contact with the dies, and distortion of the glass due to the action of gravity and the glass suspension system is significantly reduced.

By bending the glass sheet under the thermal conditions according to the invention the glass sheet is still uniformly heated when it leaves the bending station and accordingly "springback" in any significant degree is eliminated.

Further in accordance with the invention the glass sheet is heated in a furnace to the minimum temperature consistent with the requirements of an ensuing bending operation. Since there is no substantial heat extraction by the bending dies, there is no requirement to heat the glass sheet excessively. By utilising bending apparatus embodying the present invention a much more accurate and consistent bend can be imparted in each operation to successive glass sheets located between the bending dies. A few degrees temperature difference at the instant of final bending are very important.

The invention also comprehends apparatus for bending a glass sheet comprising bending dies having complementary surfaces and operatively associated with means effective to maintain said die surfaces at substantially the bending temperature for the glass sheet to be located between them.

The bending die surfaces may be periodically heated to ensure an even temperature in the dies at a desired level, which is the average temperature in the flat glass sheet emerging from the heating furnace to preserve the required bending temperature in the glass.

It will also be appreciated that it may not be necessary to reheat the dies after each bending operation but only to maintain them and the surrounding conditions at the optimum bending temperature. The thickness of the dies is thus immaterial, but by the very nature of the high temperature conditions, they would need to be capable of maintaining their accuracy of shape under the existing thermal conditions.

The apparatus according to the invention preferably comprises heated horizontally acting complementary bending dies and may be constituted by solid members with complementary convex and concave surfaces.

Apparatus for bending glass sheets according to the invention may comprise means for interposing between the two die surfaces and the respective faces of the glass sheet, a layer of a material which is non-sticking or non-wettable with respect to the glass. For example a sheet of silica fibre-cloth may be used between each die surface and the sheet of hot glass. Alternatively, a layer of boron nitride in paste form may be spread over the die surface. This material may be applied over the die surfaces by spraying, brushing or dipping, and is then cured in situ by the subsequent heating of the dies.

In accordance with the invention the bending dies may be housed in a heated chamber having an inlet for the heated flat glass sheets in alignment with an exit from the furnace and the conveying means in the furnace extended through the bending station. Moreover the furnace may be sectionalised to provide multistage heating, the stages being so designed that the residence period of glass sheets in each section is synchronised with intermittent operation of the bending dies, thereby achieving a continuous procession of glass sheets through the furnace and the bending station.

The sheet bending installation may, if desired, feed two or more quenching stations, wiccch would also require no modification to the time interval in the several heating stages of the furnace. Alternatively, a sheet bending installation may be followed by a single quenching station, also requiring no modification to the time interval in the several heating stages of the furnace.

If the degree of curvature required in the glass sheet is too severe in the side portions, the glass may be performed to near the final curvature of the main body of the glass by any means well known in the art, e.g., by a pair of vertical bending dies of the solid convex and peripheral concave type in which case the heat taken from the glass during the preliminary bending can be restored by its subsequent contact with the heated bending dies. Thereafter, the glass is formed to the final desired curvature by the heated bending dies as previously described.

BRIEF DESCRIPTION OF THE DRAWINGS

Some embodiments of the invention are now described, by way of example, with reference to the accompanying drawings in which.

Like references designate the same or similar parts.

DESCRIPTION OF THE PREFERRED EMBODIMENT

Figure 1:
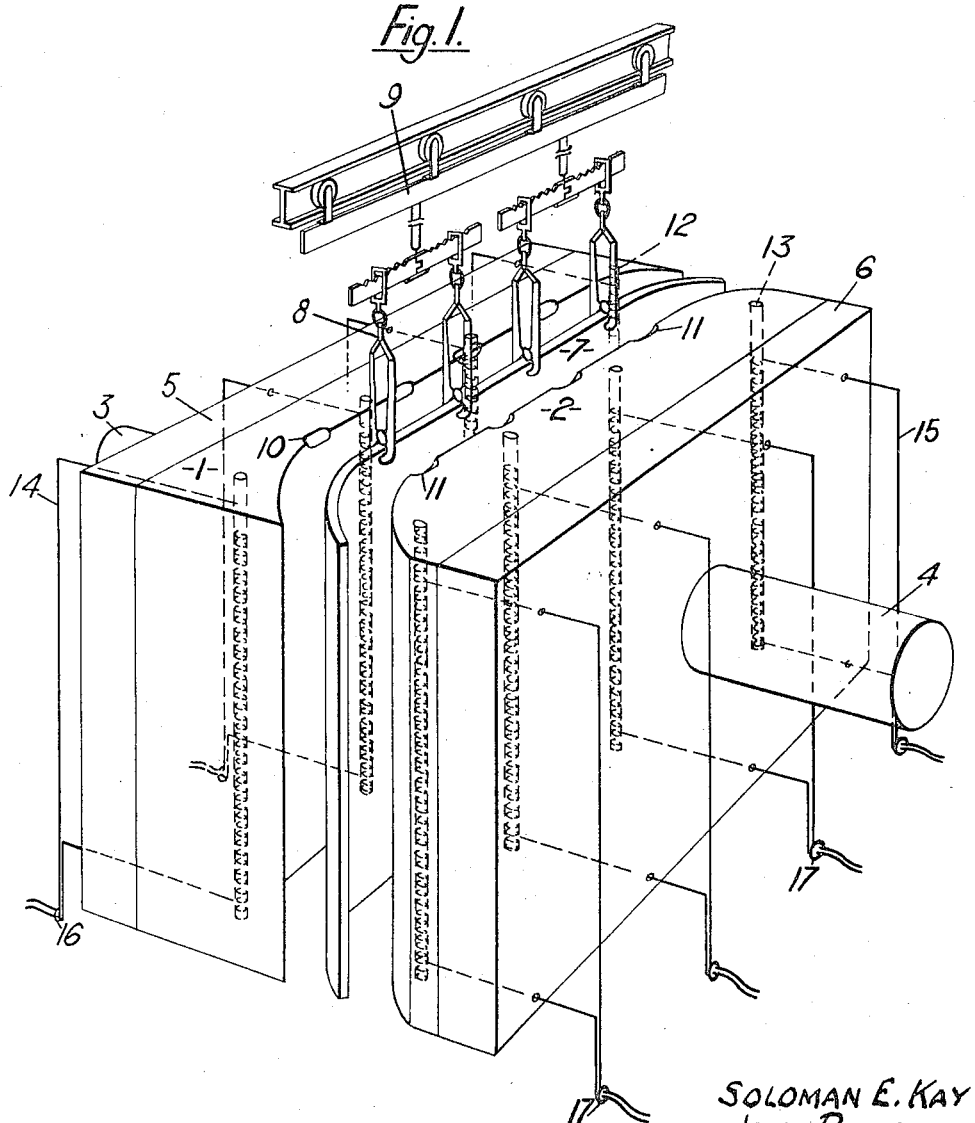
FIG. 1 is a perspective view of the bending dies according to the present invention.

Referring first to FIG. 1 of the drawings, a pair of solid complementary dies 1 and 2 of refractory material are shown mounted on horizontally acting rams 3 and 4 respectively, by which they are actuated by conventional hydraulic means, the rams being secured to backing plates 5 and 6 of the dies in known manner.

The dies are shown in equi-spaced relation from the glass sheet 7 suspended in known manner by tongs 8 hanging from a travelling tong bar 9 which runs on a overhead conveyor rail 90. The upper edges and faces of the dies 1 and 2 are recessed as indicated at 10 and 11 to accommodate the jaws of the tongs when the dies are closed on to the glass sheet during a bending operation.

In operation the glass is travelled from a heating furnace of the known electrical type to the midway position located between the dies 1 and 2, the dies having been heated up to at least the bending temperature of the glass. Immediately thereafter the dies move towards the glass, and effect the bending operation during which they impose on the glass sheet the curvature of the die faces 1 and 2, which curvature is retained by the glass because of the thermal homogeneity of the glass at the finish of the bending operation and after the dies are retracted therefrom.

The dies may be constructed of refractory metal, for example, heat resistant stainless steel, but preferably they may be formed of a suitable castable refractory, for example a refractory having a high silica or a high alumina content. The conforming surface of each die may be given a fine surface finish by coating the surface of the die with an organo-platinum paste which may be spread over the die surface with a brush to obtain an even coating. The refractory base is then heated to a specified temperature and the organo-platinum is thereby converted to a hard surface coating of metallic platinum. The conforming surfaces of the dies are then polished to obtain a bright smooth surface and the bending dies are ready for use.

Each die may comprise embedded resistance heaters, indicated at 12 and 13, lying parallel to the conforming surfaces of the dies, for electrically heating the bodies of the dies and hence the conforming surface of each die up to the bending temperature of the glass. The resistances 12 and 13 are connected by leads 14 and 15 to mains supply terminals indicated at 16 and 17.

By bending flat sheets of glass as herein described a precise curvatuve is imposed and retained by the glass which curvature corresponds more exactly to the surfaces of the complementary dies, than is imposed by previously known methods.

The bending dies used in accordance with the invention and constructed as exemplified with reference to FIG. 1 may be erected at a bending station situated between the furnace for heating the glass sheet and a quenching station, the glass being travelled in the direction of the bending station upon leaving the furnace, and on to the adjacent quenching station by means of the travelling tong bar 9. Because the glass after bending is substantially at the temperature of the glass on leaving the furnace, quenching can be effected through the maximum temperature range, and since the glass is thermally homogeneous it is uniformly quenched and thereby insidious points of fracture in the glass are avoided.

After completion of the bending operation the tong marks are less, compared with conventional bending methods where the glass sheet has to be heated in the furnace to much nearer its softening point and has to move in suspended condition from the furnace to the bending station, since it is no longer necessary to heat the glass sheet considerably above its bending temperature.

Heat imparted to the glass sheet is fully retained during the bending operation so that perfect conformity with the precisely shaped surfaces of the bending dies is achieved and if the bent glass is to be toughened, quenching is effected through a maximum temperature range.

Instead of using complementary bending surfaces which are intimately associated with electrical resistance heaters as already described with reference to FIG. 1, the complementary surfaces may be maintained at the desired bending temperature by mounting them in a heater chamber. The complementary bending surfaces are arranged within the heated chamber for simultaneous movement both towards each other for bending and away from each other after bending ready for acceptance of a succeeding sheet of glass.

Figure 2:
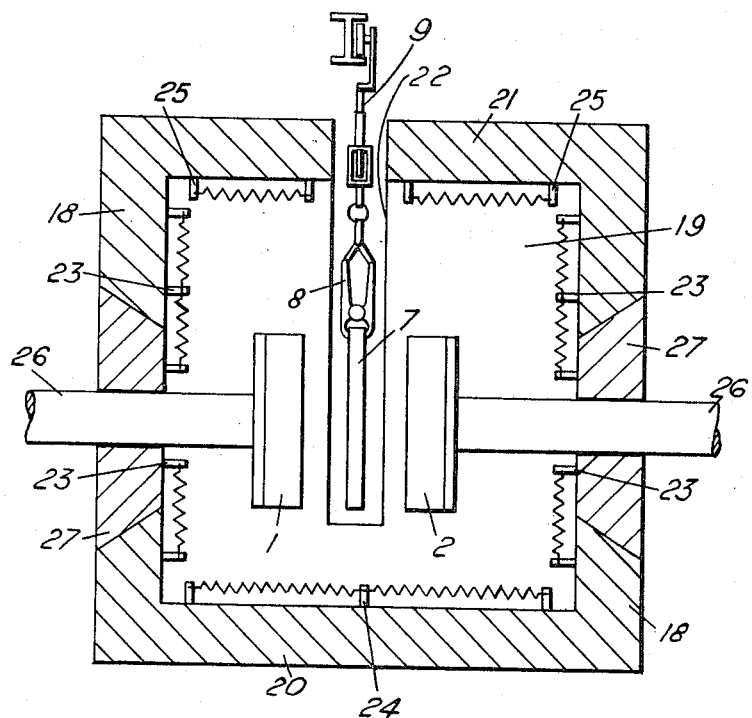
FIG. 2 is a sectional view of a heating chamber, including bending dies according to the present invention.

In FIG. 2 there is shown a chamber with refractory walls which including side walls 18, end walls 19 (one only of which is shown), a floor 20 and a roof 21 which latter and each end wall 19 are slotted as indicated at 22, for passage of a sheet of glass 7 suspended by tongs 8 hanging from the travelling tong bar 9 which runs on the conveyor rail 90 which extends above the heated chamber.

On the inner walls of the chamber are mounted electrical resistance heaters indicated at 23 and further heaters may be mounted on the floor and roof as indicated at 24 and 25 respectively.

In known manner the slots 22 can be closed by hinged doors normally operable to seal the chamber especially during the bending operation, and to permit passage of the flat glass out of the heating furnace into the chamber and the bent glass out of the chamber for discharge either to an unloading station or to a quenching station if the bent glass is to be toughened.

The complementary bending surfaces shown in FIG. 2 are identical with those shown in FIG. 1 and shafts 26 mounted in the side walls 18 of the chamber by which shafts the dies 1 and 2 are operated may be hydraulically actuated in any usual manner well known in the art. The side walls 18 may have removable panels 27 for the purpose of servicing the dies 1 and 2.

Figure 3:
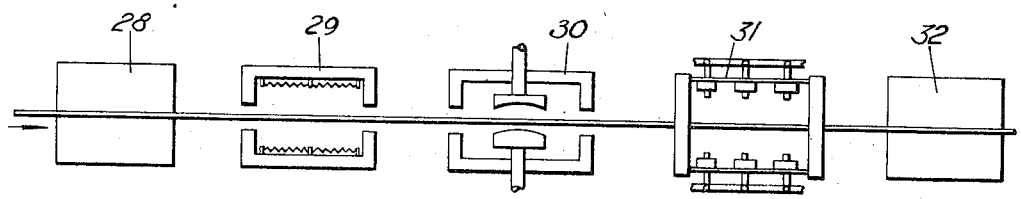
FIG. 3 illustrates diagrammatically a sequence of stations at each of which a travelling tong bar is halted for the necessary operation at each respective station.

In FIG. 3 there is diagrammatically illustrated a sequence of stations at each of which the travelling tong bar 9 is halted for the necessary operation at each respective station.

In FIG. 3 there are indicated a loading station 28, a furnace 29 with wall-mounted electrical resistance heaters 290 for heating up flat glass suspended from the tong bar 9 to bending temperature, a bending chamber 30 of the kind illustrated in FIG. 2 maintained at the bending temperature for the glass, adjacent to which is a quenching station 31 and the last station in the series — station 32 is the unloading station. The sequence of components in the installation described may be a linear sequence or a closed circuit. In a closed circuit the components may be arranged in either a vertical or a horizontal loop.

The conveyor rail 90 runs above the loading station 28 and then over furnace means including the furnace chamber 29 with wall-mounted electrical resistance heaters 290 for establishing within the chamber an environment to heat a glass sheet suspended from the tong bar 9 as it passes therethrough to a selected temperature within the bending temperature range of the glass. This chamber 29 has an entrance opening 291 and an exit opening 292.

In the furnace chamber 29 each flat glass sheet is heated to a selected bending temperature which is an inherent thermally inhomogeneous condition in which localised variations of temperature of the order of 5°C can exist for example from top to bottom of the sheet, or the side edges of the sheet may be a few degrees, e.g., 10°C hotter than the central region of the sheet. The average temperature of each sheet is at or near the selected bending temperature.

The run of the rail 90 continues over bending means including a bending chamber 30 of the kind illustrated in FIG. 2, which is aligned with the heating chamber 29 and is maintained by the heaters 23 at the bending temperature of the glass. The bending means includes the pair of bending dies 1 and 2 housed within the chamber 30, and therefore maintained by the heaters 23 at the selected bending temperature. The dies 1 and 2 have complementary bending surfaces of the desired curvature to be imparted to each of a procession of glass sheets which are moved by the conveyor means including the rail 90 and tong bars 9 through the heating chamber 29 whereby each sheet emerges through the exit 292 and the heating chamber in a heated condition such that its average temperature is near the selected bending temperature.

The bending chamber 30 has an entrance opening 301 aligned with the exit opening 292 of the heating chamber to receive the emergent heated glass sheets in succession.

The shafts 26 on which the bending dies are mounted are hydraulically operated for advancing and retracting both of said bending dies, which are at the bending temperature of the glass, to engage opposite sides of each glass sheet and impart thereto the desired curvature, and for maintaining the bending surfaces in contact with opposite sides of the sheet for a time sufficient to consolidate the shape of the sheet at said curvature and to establish a thermal condition of the sheet at the temperature of the bending surfaces to assure close retention of the curvature on withdrawal of the bending surfaces from both surfaces of the glass sheet.

This thermal condition is a condition of thermal homogeneity in the glass sheet in which there is equality of temperature of the bending surfaces and of the glass sheet being bent so that the glass sheet is at said selected bending temperature throughout the thickness dimension of the glass sheet and over the surfaces thereof. The above mentioned inherent thermal inhomogeneities are thereby permitted to even out while the bending surfaces are closed on to the glass sheet and the resulting thermal homogeneity of the glass at the finish of the bending operation eliminates any significant degree of springback and ensures that the curvature of the bending surfaces of the dies 1 and 2 is retained in the bent glass sheet after the dies are withdrawn.

This withdrawal of the dies takes place when the thermal homogeneity in the glass sheet is established, and the bent glass sheet is removed from the bending chamber 30 while that condition of thermal homogeneity prevails, to the quenching station 31 which is aligned with the exit 302 from the bending chamber and where there is uniform cooling of both surfaces of the glass sheet from the condition of thermal homogeneity upon its emergence from the bending chamber.

The conveyor rail 90 extends beyond the quenching station 31 to the unloading station 32 where the curved toughened glass sheet is unloaded from the tongs.

We have also discovered that the rate of die closure, as related to the glass thickness and the bending temperature also has an effect on the die dwell time required, that is the period of complete closure of the dies. For example, when using a rapid die closure which would be desirable for a practical system one may find that for the lower bending temperatures permitted by this invention it may be necessary to extend the die dwell time beyond that required strictly to achieve thermal homogeneity.

This factor should be weighed in any practical system. For example as noted it is possible with the invention to go to lower bending temperatures than are conventional and this allows a saving in heat input at the same time, as one would expect. The die dwell time rapidly increases as the bending temperature decreases.

As the dies close on to a flat glass sheet to be bent, transient tensile stresses are set up in the convex surface of the glass sheet. The magnitude of these stresses depends on the rate at which the sheet is bent, that is the rate of closure of the dies, and a maximum value of rate of closure should not be exceeded so as to avoid inducing undesirable tensile stresses in the convex surface of the sheet which could damage the sheet. These stresses relax quickly by viscous flow in the glass. The higher the glass temperature the quicker these stresses relax.

The time period occupied by the closing of the dies on to the glass sheet is therefore of significance in determining the amount of residual stress in the bent glass sheet when the dies are fully closed. Thermal flows which take place when the hot dies are closed on to the glass to produce the condition of thermal homogeneity, enhance uniformity of viscous flow in the glass to relax those transient stresses.

Table I gives some examples of operation for bending of windshield glasses 2 mm, 4 mm and 6 mm thick over a range of bending temperatures from 570°C to 600°C. The width of the windshield is 150 cm and the windshield is bent to a curvature of 5.0 m radius over the central region of width 90 cm and a curvature of radius of 2.5 m over the outer wing portions of the windshield. The time taken by die movement from the first contact of the dies with the sheet to the complete closure of the dies on to the sheet is designated "Die Close Period" and the time the dies are maintained closed to consolidate the shape of the bent sheet is designated "Die Dwell Time." These figures are for operation in such a way that any springback which is observed does not exceed 1 mm.

TABLE I

| Bending Temperature (°C) | Glass Thickness (mm) | Die Close Period (sec.) | Die Dwell Time (sec.) |
| --- | --- | --- | --- |
| 570 | 2 | 3 | 57 |
|     | 4 | 6 | 49 |
|     | 6 | 9 | 44 |
| 580 | 2 | 3 | 21 |
|     | 4 | 6 | 17 |
|     | 6 | 9 | 15 |
| 590 | 2 | 3 | 8 |
|     | 4 | 6 | 7 |
|     | 6 | 9 | 6 |
| 600 | 2 | 3 | 3 |
|     | 4 | 6 | 3 |
|     | 6 | 9 | 2 |

The thicker the glass, the longer the die close period found to be suitable and standard settings of 3, 6 and 9 seconds were found suitable for the bending of glasses 2 mm, 4 mm and 6 mm thick respectively, for the bending temperatures within the range given in Table I.

When going to the lower temperatures permitted by this invention the factor of introduced mechanical stress may become dominant in a practical system and must be considered. In any event the problem of springback which we have discovered stems from the fact that a condition of thermal inhomogeneity inherently prevails in any practical system even though thermal homogeneity is intended to be derived from the furnace and is in fact very closely approximated in practical systems. Such thermal inhomogeneities, even though small and seemingly insignificant, we have nevertheless found to be significant with respect to the springback problem. We have found that it is essential to force a condition of thermal homogeneity during the bending operation such that residual stresses stemming from temperature differences or gradients and any transient stresses stemming from the physical operation of bending are not present at the time the bending dies are retracted to terminate the bending step. Thus it is essential that the bending operation be controlled as described such that elimination of springback is assured.

We claim:

1. A method of manufacturing a curved glass sheet which comprises the steps of:
   a. heating a glass sheet substantially to a selected temperature within the bending temperature range of the glass;
   b. heating complementary bending surfaces to said selected bending temperature;
   c. applying the bending surfaces while heated to the temperature of step (b) to the opposite side surfaces of the glass sheet heated to the temperature of step (a) to conform the sheet to the curvature of said bending surfaces;
   d. continuing step (c) for a time sufficient to consolidate the shape of the sheet at said curvature and to establish a thermal condition of the sheet at the temperature of said bending surfaces to assure close retention of said curvature on withdrawal of the bending surfaces from both surfaces of the glass sheet;
   e. withdrawing said bending surfaces from both surfaces of the glass sheet at the end of said time, and then
   f. uniformly cooling both surfaces of the curved sheet from the thermal condition established by step (d).

2. A method according to claim 1, including engaging at least one of the bending surfaces with marginal areas only of the glass sheet.

3. A method according to claim 1, including employing bending surfaces of which each bending surface has an area projected on to the plane of the glass sheet which is at least equal to the surface area of said glass sheet.

4. A method according to claim 1, including maintaining the bending surfaces at said selected bending temperature by periodically heating respective bending dies on which said surfaces are provided.

5. A method according to claim 1, wherein the glass sheet is quenched in step (f) to provide a toughened, curved glass sheet.

6. Apparatus for bending glass sheets, comprising:
   a. furnace means including a first chamber for establishing an environment to heat a glass sheet passing therethrough to a selected temperature within the bending temperature range of the glass, said first chamber having entrance and exit openings;
   b. bending means including a second chamber aligned with said first chamber and cooling means aligned with said second chamber;
   c. conveyor means for moving a procession of glass sheets through said first chamber whereby each glass sheet emerges from said first chamber in a heated condition such that its average temperature is near said selected bending temperature;
   d. said bending means including a pair of bending dies housed within said second chamber and having complementary bending surfaces of the desired curvature to be imparted to each of said glass sheets, each bending die comprising a base of a castable refractory having a high content of silica or alumina, which base is coated with an organoplatinum paste which is fired and polished to present a smooth bending surface, and said second chamber having entrance and exit openings and being aligned with said exit opening of the first chamber to receive the emergent heated glass sheets in succession;
   e. means for maintaining said bending surfaces at said selected bending temperature;
   f. means for advancing and retracting both of said bending dies to engage opposite sides of each glass sheet and impart thereto said desired curvature and for maintaining said bending surfaces in contact with the opposite sides of a sheet for a time sufficient to consolidate the shape of the sheet at said curvature and to establish a thermal condition of the sheet at the temperature of said bending surfaces to assure close retention of said curvature on withdrawal of the bending surfaces from both surfaces of the glass sheet; and
   g. said cooling means including means for cooling both surfaces of each curved glass upon its emergence from said second chamber.

7. Apparatus according to claim 6, in which the said means for maintaining the die surfaces at said selected bending temperature comprise heating means located internally of the respective dies.

8. Apparatus according to claim 6, in which the dies are horizontally acting, and in which sheet supporting means are provided for supporting a glass sheet to be bent in a substantially vertical plane between the dies.

9. Apparatus according to claim 6, in which said furnace means comprises a series of heating chambers.

10. Apparatus according to claim 6, wherein said bending means includes a further pair of complementary bending dies to perform an initial bending of each heated glass sheet prior to final bending by the first mentioned bending dies.

11. Apparatus according to claim 6, wherein said means for cooling consists of a quenching station for toughening each curved glass sheet.

12. A method of manufacturing a curved glass sheet which comprises the steps of:
   a. heating a glass sheet at one location to an inherent thermally inhomogeneous condition in which its average temperature is a selected temperature within the bending temperature range of the glass,
   b. heating complementary bending surfaces at a second location to said selected temperature,
   c. removing the glass sheet from said one location to said second location and applying the bending surfaces while heated to the temperature of step (b) to the opposite side surfaces of the glass sheet heated to the condition of inherent thermal inhomogeneity of step (a) to conform the sheet to the curvature of said bending surfaces,
   d. continuing step (c) for a time sufficient to establish thermal homogeneity in the glass in which there is equality of the temperatures of the bending surfaces and the glass sheet being bent and the temperature of the glass sheet is within said selected bending temperature range throughout the thickness dimension of the glass sheet and of uniform temperature across both surfaces of the glass sheet,
   e. withdrawing said bending surfaces from both surfaces of the glass sheet when said thermal homogeneity in the glass sheet is established and removing the glass sheet from said second location while said condition of thermal homogeneity prevails for assuring close retention of said curvature imparted to the glass sheet by said bending surfaces, and f. uniformly cooling both surfaces of the curved sheet from the condition of thermal homogeneity established by step (d).

13. The method of eliminating spring back in any significant degree during the manufacture of curved glass sheets, which comprises the steps of:
   a. advancing a pair of complementary bending surfaces into engagement with the opposite surfaces of a heated glass sheet for conforming the heated glass sheet to the curvature of said bending surfaces;
   b. heating said bending surfaces for maintaining them at a temperature during step (a) which is the same as the temperature of the heated glass sheet;
   c. maintaining said bending surfaces against said opposite surfaces of the glass sheet for a time sufficient to eliminate spring back; and then
   d. retracting said bending surfaces simultaneously from the opposite surfaces of said glass sheet; and then
   e. uniformly cooling said glass sheet.

14. The method as defined in claim 13 wherein the glass sheet is heated to a temperature in the lower region of the bending temperature range.

15. The method of producing a curved glass sheet while eliminating spring back in any significant degree, the glass of said sheet having a bending temperature range lying between a lower limit and an upper limit, said method comprising the steps of:
   a. heating the glass sheet to a low temperature above but near said lower limit;
   b. heating complementary bending surfaces to the low temperature to which the glass sheet is heated in step (a);
   c. applying the bending surfaces to the opposite side surfaces of the heated glass sheet to conform the glass sheet to the curvature of said bending surfaces;
   d. maintaining said bending surfaces against said opposite side surfaces of the glass sheet for a time sufficient to eliminate spring back; and then
   e. uniformly cooling said glass sheet.

16. A method according to claim 1, wherein the step of applying heated bending surfaces to the opposite side surfaces of the glass sheet includes enforcing movement of the bending surfaces from a position of first contact with the surfaces of the glass sheet to a position of complete application of the surfaces against the glass sheet surfaces in a time period related to glass thickness and longer for thicker glass than for thinner glass, such that residual bending stresses in the glass at the end of that period subsequently relax during the time of continuing application of the bending surfaces to the sheet.

17. The method of producing a curved sheet of soda-lime-silica glass while eliminating spring back to any significant degree, the glass sheet having a bending temperature range lying between a lower limit of 550°C and an upper limit of 680°C, said method comprising the steps of:
   a. heating the glass sheet to a low temperature above but near said lower limit of 550°C;
   b. heating complementary bending surfaces to the low temperature to which the glass sheet is heated in step (a);
   c. enforcing movement of the bending surfaces from a position of first contact with the surfaces of the glass sheet to a position of complete application of the surfaces against the glass sheet surfaces now curved to the curvature of said bending surfaces in a time period so related to glass thickness as to minimise residual bending stresses in the glass at the end of that period.
   d. maintaining said bending surfaces against said glass sheet surfaces for a time sufficient to eliminate spring-back;
   e. withdrawing said bending surfaces from the opposite surfaces of the curved glass sheet; and then
   f. uniformly cooling said curved glass sheet.

18. A method of producing a curved sheet of soda-lime-silica glass while eliminating spring back to any significant degree, the glass sheet having a bending temperature range lying between a lower limit of 570°C and an upper limit of 600°C, said method comprising the steps of:
   a. heating the glass sheet to a temperature in that range;
   b. heating complementary bending surfaces to the temperature to which the glass sheet is heated in step (a);
   c. enforcing movement of the bending surfaces from a position of first contact with the surfaces of the glass sheet to a position of complete application of the surfaces against the glass sheet surfaces now curved to the curvature of said bending surfaces in a time period so related to glass thickness as to minimise residual bending stresses in the glass at the end of that period;
   d. maintaining said bending surfaces against said glass sheet surfaces for a time sufficient to eliminate spring-back;
   e. withdrawing said bending surfaces from the opposite surfaces of the curved glass sheet; and then
   f. uniformly cooling said curved glass sheet.

* * * * *